(12) United States Patent
Kim (10) Patent No.: US 9,440,512 B2
(45) Date of Patent: Sep. 13, 2016

(54) AIR CONDITIONING SYSTEM FOR VEHICLE

(71) Applicant: Hyundai Motor Company, Seoul (KR)

(72) Inventor: Jae Yeon Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 280 days.

(21) Appl. No.: 14/055,284

(22) Filed: Oct. 16, 2013

(65) Prior Publication Data

US 2014/0124159 A1    May 8, 2014

(30) Foreign Application Priority Data

Nov. 8, 2012  (KR) .................. 10-2012-0126238

(51) Int. Cl.
*F25B 27/00* (2006.01)
*B60H 1/32* (2006.01)

(52) U.S. Cl.
CPC ............... *B60H 1/32* (2013.01); *B60H 1/323* (2013.01); *B60H 1/3227* (2013.01)

(58) Field of Classification Search
CPC ....... B60H 1/32; B60H 1/3227; B60H 1/323
USPC ........................................ 62/238.7
See application file for complete search history.

(56) References Cited

U.S. PATENT DOCUMENTS

| | | | |
|---|---|---|---|
| 5,031,690 A * | 7/1991 | Anderson ............ | B60H 1/3226 165/43 |
| 5,138,851 A * | 8/1992 | Mardikian ......... | B60H 1/00271 62/244 |
| 5,641,016 A * | 6/1997 | Isaji ................... | B60H 1/00007 165/43 |
| 6,038,877 A * | 3/2000 | Peiffer ............... | B60H 1/00007 62/244 |
| 6,640,889 B1 * | 11/2003 | Harte ................. | B60H 1/00885 165/202 |
| 6,866,092 B1 * | 3/2005 | Molivadas ............... | F01L 3/12 123/41.2 |
| 2001/0027663 A1 * | 10/2001 | Zeigler .............. | B60H 1/00007 62/406 |
| 2005/0000473 A1 | 1/2005 | Ap et al. | |
| 2005/0067158 A1 * | 3/2005 | Ito ...................... | B60H 1/00007 165/204 |
| 2005/0133215 A1 * | 6/2005 | Ziehr ................. | B60H 1/00392 165/202 |
| 2005/0268644 A1 * | 12/2005 | Oshitani ............... | B60H 1/323 62/500 |
| 2006/0005557 A1 * | 1/2006 | Takano .............. | B60H 1/00878 62/238.6 |
| 2007/0175230 A1 * | 8/2007 | Plummer ............. | B60H 1/3226 62/236 |
| 2009/0013705 A1 * | 1/2009 | Nishikawa ............... | B60H 1/00 62/239 |
| 2010/0282434 A1 * | 11/2010 | Yabuuchi ............ | F24D 11/0235 165/63 |
| 2011/0132017 A1 | 6/2011 | Kim et al. | |

(Continued)

FOREIGN PATENT DOCUMENTS

| | | |
|---|---|---|
| JP | 2008-057950 A | 3/2008 |
| JP | 4970022 A | 4/2012 |

(Continued)

*Primary Examiner* — Ljiljana Ciric
(74) *Attorney, Agent, or Firm* — McDermott Will & Emery LLP (57) ABSTRACT

An air conditioner for a vehicle includes a cooler including a first radiator, a cooling fan sending air flow to the first radiator, a reservoir tank connected with the first radiator to store a cooling fluid, and a water pump circulating the cooling fluid. A water-cooled condenser is connected with the cooling line to condense superheated steam and a two-phase refrigerant, which includes gas and liquid, by heat exchange with the cooling fluid. An air-cooled condenser is connected with the water-cooled condenser through a refrigerant line in series to condense the refrigerant by heat exchanging with external air as the vehicle travels and to discharge the condensed refrigerant to a receiver drier.

5 Claims, 4 Drawing Sheets

(56) References Cited

U.S. PATENT DOCUMENTS

| | | | |
|---|---|---|---|
| 2011/0132030 A1 | 6/2011 | Kim et al. | |
| 2011/0232868 A1 | 9/2011 | Iwasaki et al. | |
| 2012/0285170 A1* | 11/2012 | Mori | B60H 1/3227 60/670 |
| 2012/0291478 A1* | 11/2012 | Kim | F25B 39/04 62/507 |
| 2013/0074525 A1* | 3/2013 | Johnston | B60H 1/00278 62/56 |
| 2013/0139528 A1* | 6/2013 | Katayama | B60H 1/00921 62/81 |
| 2013/0298583 A1* | 11/2013 | O'Donnell | H01M 6/5038 62/115 |
| 2014/0096560 A1* | 4/2014 | Kim | F24F 7/007 62/426 |
| 2014/0110093 A1* | 4/2014 | Kim | F28F 9/00 165/164 |
| 2015/0033782 A1* | 2/2015 | Kondo | B60H 1/00921 62/244 |

FOREIGN PATENT DOCUMENTS

| | | |
|---|---|---|
| KR | 10-2010-0059490 A | 6/2010 |
| KR | 10-0970336 B1 | 7/2010 |
| KR | 2011-0062418 A | 6/2011 |
| KR | 2012-0055414 A | 5/2012 |
| KR | 10-1222590 A | 1/2013 |

\* cited by examiner

AIR CONDITIONING SYSTEM FOR VEHICLE

CROSS-REFERENCE TO RELATED APPLICATION

This application claims priority to and the benefit of Korean Patent Application No. 10-2013-0126238 filed in the Korean Intellectual Property Office on Nov. 8, 2012, the entire contents of which are incorporated herein by reference.

TECHNICAL FIELD

The present disclosure relates to an air conditioner for a vehicle, and more particularly, to an air conditioner for a vehicle, which improves overall cooling performance by increasing a condensation rate of a refrigerant by applying a water-cooled type condenser using a cooling fluid and an air-cooled type condenser using external air together when the refrigerant is condensed.

BACKGROUND

In general, an air conditioner of a vehicle maintains pleasant indoor environment by maintaining indoor temperature of the vehicle at an appropriate temperature regardless of outside temperature.

The air conditioner of the vehicle includes a compressor for compressing a refrigerant, a condenser for condensing and liquefying the refrigerant compressed by the compressor, and an expansion valve for rapidly expanding the refrigerant condensed and liquefied by the condenser. An evaporator disposed to cool air blown into the vehicle in which the air conditioner is installed by using evaporation latent heat of the refrigerant while evaporating the refrigerant expanded by the expansion valve.

According to the related art, when a water cooling type condenser is applied for condensing the refrigerant by cooling, the coolant exchanges heat with the refrigerant in the condenser. However, power consumption is increased due to a temperature increase of the refrigerant at an outlet of the condenser.

Since the water cooling type condenser has larger thermal capacity of a coolant than that of the air cooling type condenser, condensation pressure thereof is low. However, the temperature difference between coolant and refrigerant is small and the temperature of the coolant is higher than that of external air, such that sub cool is difficult to be formed, thereby degrading general cooling performance of the air conditioner.

Further, the amount of condensation of the coolant in an environmentally-friendly vehicle to which a motor, an electric power component, a stack, and the like are applied decreases because the coolant cools each constituent element and flows into a condenser, thus increasing coolant temperature.

To address the above drawbacks, a need exists for a cooling pan and a radiator with large capacity, but creating narrow engine room and increasing weight and manufacturing cost of a vehicle.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides an air conditioner for a vehicle to improve cooling performance by reducing condensation pressure and increasing condensation performance of a refrigerant by employing a water cooling type condenser using coolant and an air cooling type condenser using external air together when the refrigerant is condensed.

An air conditioner system for a vehicle according to an exemplary embodiment of the present invention includes a cooling means including a radiator disposed at front side of a vehicle, a cooling fan configured to send wind to the radiator, a reservoir tank connected with the radiator through a cooling line to store cooling fluid, and a water pump disposed on the cooling line to circulate the cooling fluid. A water cooling type condenser is connected with the cooling line between the radiator and the reservoir tank into which the cooling fluid flows, and condenses a two-phase refrigerant, in which a superheated steam refrigerant, gas, and liquid are mixed from a compressor of an air conditioner means, through heat exchange with the cooling fluid. An air cooling type condenser is connected with the water cooling type condenser through a refrigerant line in series, into which the condensed refrigerant flows from the water cooling type condenser, disposed at front side of the radiator to condense the refrigerant through heat exchange with external air flowing in while driving and to discharge the condensed refrigerant to a receiver drier. The air cooling type condenser receives only a liquid refrigerant from which a gas refrigerant is separated while passing through the receiver drier to additionally condense the received liquid refrigerant through heat exchange with external air and to discharge the condensed refrigerant to an expansion valve.

The air conditioner means may include an expansion valve for expanding the condensed refrigerant, an evaporator for evaporating the expanded refrigerant through heat exchange with air, and the compressor for compressing the evaporated gas state refrigerant, which are connected with each other through the refrigerant line. The air conditioner means may condense the compressed refrigerant discharged from the compressor by making the discharged refrigerant sequentially pass through the water cooling type condenser and the air cooling type condenser connected with each other through the refrigerant line.

The receiver drier may be connected with the air cooling type condenser through the refrigerant line and may be provided separately.

A heating body connected through the cooling line, into which a cooling fluid passing through the water cooling type condenser flows, may be disposed between the water cooling type condenser and the radiator.

The heating body may include an electrical power component, a motor, or a stack of an environmentally-friendly vehicle, and a water cooling type intercooler of an internal combustion engine vehicle.

A radiator for an internal combustion engine for cooling an internal combustion engine in an internal combustion engine vehicle may be provided between the radiator and the cooling fan.

An air conditioner according to another exemplary embodiment of the present invention for a vehicle comprises an expansion valve for expanding a liquid refrigerant, an evaporator for evaporating a refrigerant expanded through the expansion valve through heat exchange with air, and a compressor for receiving a gas state refrigerant from the evaporator and compressing the gas state refrigerant, which are connected with each other through a refrigerant line.

The air conditioner includes a cooling means including a radiator disposed at front side of a vehicle, a cooling fan configured to send wind to the radiator, and a water pump connected through the cooling line and configured to circulate a cooling fluid. A water cooling type condenser is connected with the cooling line between the radiator and the water pump into which the cooling fluid flows, configured to condense a two-phase refrigerant, in which a superheated steam refrigerant, gas, and liquid are mixed from a compressor, through heat exchange with the cooling fluid, and disposed at one side of the radiator in a width direction of the vehicle. An air cooling type condenser is connected with the water cooling type condenser through a refrigerant line in series, into which the condensed refrigerant flows from the water cooling type condenser, disposed at front side of the radiator to condense the refrigerant through heat exchange with external air flowing in while driving and discharge the condensed refrigerant to a receiver drier. The air cooling type condenser receives a liquid refrigerant from which a gas refrigerant is separated while passing through the receiver drier to additionally condense the received liquid refrigerant through heat exchange with external air and discharge the condensed refrigerant to an expansion valve.

A heating body connected through the cooling line, into which a cooling fluid passing through the water cooling type condenser flows, may be disposed between the water cooling type condenser and the water pump.

The heating body may include an electrical power component, a motor, or a stack of an environmentally-friendly vehicle, and a water cooling type intercooler of an internal combustion engine vehicle.

The receiver drier may be separately provided at the water cooling type condenser and connected with the air cooling type condenser through the refrigerant line.

The condensers condensing the refrigerant are formed in the water cooling type and the air cooling type, respectively, to be applied together, so that the water cooling type condenser condenses the superheated steam refrigerant and the two-phase area refrigerant (the mixed refrigerant of gas and liquid). The air cooling type condenser secondarily condenses the liquid refrigerant passing through the receiver drier in a state where the two-phase area refrigerant is additionally condensed again, thereby increasing condensation performance of the refrigerant and improving general cooling performance.

The work load of the compressor by decreasing condensation pressure of the refrigerant can be decreased, thereby improving operation fuel efficiency.

The air cooling type condenser may be reduced in size by employing the water cooling type condenser, so that cooling performance is improved by increasing a passing air volume of the radiator and a temperature difference between external air and the liquid refrigerant, thereby being advantageous to form the sub cool of the refrigerant.

Improvement of the cooling performance of the radiator decreases the heat transfer amount of the cooling line, and thus, a water temperature of a circulated coolant may be decreased so that the coolant can be efficiently cooled without increasing capacity of the radiator and the cooling fan. Layout inside the narrow engine room is simplified so that space availability is improved, and weight and manufacturing cost are improved.

Further, when the present disclosure is applied to an environmentally-friendly vehicle, such as a fuel cell vehicle and an electric car, the heating body, such as an electrical power component, a motor, and a stack or an intercooler of an internal combustion engine vehicle, and the air conditioner refrigerant may be cooled by using the integrated radiator, thereby improving cooling performance and simplifying the configuration.

BRIEF DESCRIPTION OF THE DRAWINGS

The drawings are for reference to describe the exemplary embodiments of the present disclosure and shall not be construed that the technical spirit of the present disclosure is limited to the accompanying drawings.

DETAILED DESCRIPTION

Hereinafter, the present disclosure will be described more fully hereinafter with reference to the accompanying drawings, in which exemplary embodiments are shown.

The exemplary embodiments described in the specification and the configuration illustrated in the drawings are simply the exemplary embodiments of the present disclosure, and do not represent all of the technical spirits of the present disclosure, and thus there are various equivalents and modification examples substitutable with the exemplary embodiment described in the present specification and the configuration illustrated in the drawing at the time of filing the present disclosure.

In addition, throughout the specification, unless explicitly described to the contrary, the word "comprise" and variations such as "comprises" or "comprising," will be understood to imply the inclusion of stated elements but not the exclusion of any other elements.

Figure 1:
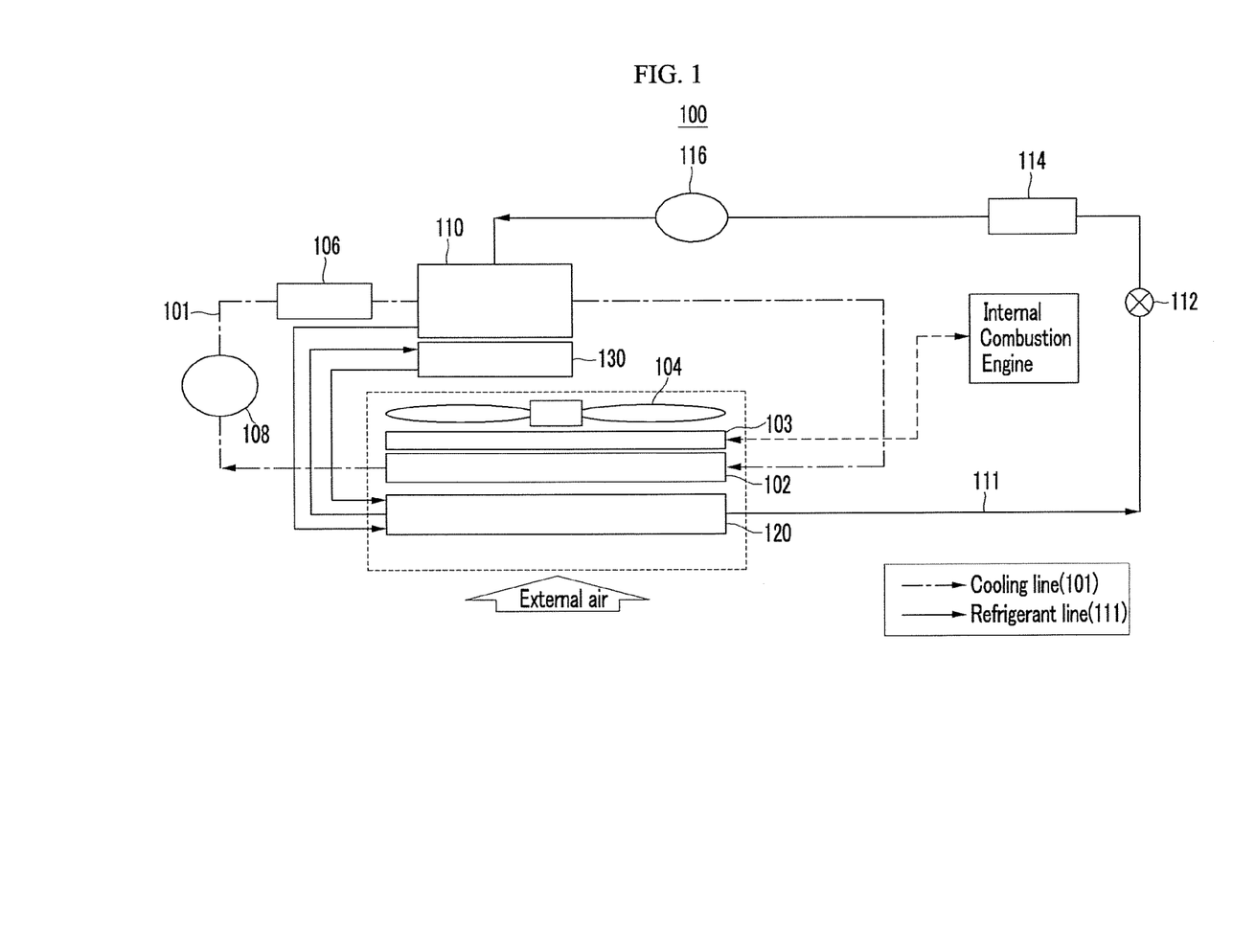
FIG. 1 is a block diagram of an air conditioner for a vehicle according to a first exemplary embodiment of the present disclosure.

FIG. 1 is a block diagram of an air conditioner for a vehicle according to a first exemplary embodiment of the present disclosure.

Referring to FIG. 1, an air conditioner 100 for a vehicle improves cooling performance by reducing condensation pressure and increases condensation performance of a refrigerant by applying a water cooling type condenser using a coolant and an air cooling type condenser using external air together when the refrigerant is condensed.

To this end, the air conditioner 100 for the vehicle includes a cooling means, a water cooling type condenser 110, and an air cooling type condenser 120, and each constituent element will be described in more detail below.

The cooling means includes a radiator 102 disposed at front side of the vehicle and a cooling fan 104 for sending wind to the radiator 102.

The cooling fan 104 is connected with a controller, which is not illustrated here, so that the air volume may be adjusted according to a state of the vehicle and temperature of coolant or cooling fluid.

The cooling means further includes a reservoir tank 106 connected with the radiator 102 through a cooling line 101 through which a cooling fluid flows to store the cooling fluid, and a water pump 108 provided on the cooling line 101 to circulate the cooling fluid.

The cooling fluid may include a coolant.

A radiator 103 for cooling an internal combustion engine for a vehicle may be further provided between the radiator 102 and the cooling fan 104.

The radiator 103 for the internal combustion engine is connected with the internal combustion engine through a cooling line separated from the cooling line 102 included in the cooling means. The radiator 103 cools heat generated in the internal combustion engine and the heated cooling fluid with external air and through an operation of the cooling fan 104, and supplies the cooled cooling fluid again.

The water cooling type condenser 110 is connected with the cooling line 101 between the radiator 102 and the reservoir tank 106 so that the cooling fluid flows in. A two-phase refrigerant in which superheated steam refrigerant, gas, and liquid are mixed flows in through a refrigerant line 111 through which the refrigerant flows from the compressor 116. The water cooling type condenser 110 condenses the refrigerant through heat exchange between the coolant and the refrigerant.

The air conditioner means includes an expansion valve 112 for expanding the condensed refrigerant, an evaporator 114 for evaporating the expanded refrigerant through heat exchange between the expanded refrigerant and air, and a compressor 116 for compressing the refrigerant in an evaporated gas state, which are connected with each other through the refrigerant line 111.

The air conditioner means condenses the compressed refrigerant discharged from the compressor 116 by making the refrigerant sequentially pass through the water cooling type condenser 110 and the air cooling type condenser 120, which are connected with each other through the refrigerant line 111.

The air cooling type condenser 120 is connected with the water cooling type condenser 110 in series through the refrigerant line 111, so that the condensed liquid refrigerant flows into the air cooling type condenser 120 from the water cooling type condenser 110.

The air cooling type condenser 120 is disposed at front side of the radiator 102 to condense the refrigerant through heat exchange with external air flowing in while driving and to discharge the condensed refrigerant to a receiver drier 130.

The air cooling type condenser 120 receives only the liquid refrigerant from which the gas refrigerant is separated while passing through the receiver drier 130 and additionally condenses the received liquid refrigerant through heat exchange with external air to discharge the refrigerant to the expansion valve 112.

The receiver drier 130, which separates a gas state refrigerant left in the condensed refrigerant, may be connected with the air cooling type condenser 120 through the refrigerant line 111 and may be provided separately.

The receiver drier 130 separates a non-condensed gas refrigerant, which is included in the refrigerant condensed by the air cooling type condenser 120 and fails to be phase changed, from the liquid refrigerant and supplies the separated refrigerant to the air cooling type condenser 120 again.

The air cooling type condenser 120 receives a two-phase refrigerant (a mixed refrigerant of liquid and gas) first condensed through the water cooling type condenser 110, condenses the received two-phase refrigerant through heat exchange with external air, and discharges the condensed refrigerant to the receiver drier 130.

That is, the receiver drier 130 separates the non-condensed state gas refrigerant included in the introduced refrigerant from the liquid refrigerant, and makes only the liquid state refrigerant flow into the air cooling type condenser 120 through the refrigerant line 111. In this case, the receiver drier 130 may also filters foreign materials included in the refrigerant.

Then, the air cooling type condenser 120 condenses the liquid state refrigerant from which the gas state refrigerant failing to be phase changed is separated by the receiver drier 130 through heat exchange with external air again, thereby improving condensation efficiency of the refrigerant.

The water cooling type condenser 110 cools the refrigerant by using coolant having a larger heat transfer coefficient than that of external air, thereby decreasing condensation pressure inside the water cooling type condenser 110.

The air cooling type condenser 120 first condenses the refrigerant condensed while passing through the water cooling type condenser 110 through heat exchange with external air, makes the condensed refrigerant flow into the receiver drier 130, and receives only the liquid state refrigerant again. The air cooling type condenser 120 then cools the received liquid state refrigerant by using external air again in a state where the non-condensed gas refrigerant included in the liquid refrigerant is separated, so that the temperature difference between the external air and the refrigerant is increased, thereby being advantageous to form sub cool and decreasing a heat transfer amount of the cooling line 101.

That is, the air conditioner 100 for the vehicle employs the water cooling type condenser 110 and the air cooling type condenser 120 together to complement the drawbacks according to each type by efficiently using the condensation pressure decrease, which is the advantage of the water cooling type, and the advantageous forming of the sub cool, which is the advantage of the air cooling type, thereby improving general cooling performance of the air conditioner 100.

The condensers 110 and 120 condensing the refrigerant are formed in the water cooling type and the air cooling type, respectively, to be applied together, so that the water cooling type condenser 110 condenses the superheated steam refrigerant and the two-phase area refrigerant (the mixed refrigerant of gas and liquid). The air cooling type condenser 120 secondarily condenses the liquid refrigerant passing through the receiver drier 130 in a state where the two-phase area refrigerant is additionally condensed again, thereby increasing condensation performance of the refrigerant and improving general cooling performance.

The work load of the compressor by decreasing the condensation pressure of the refrigerant is decreased, thereby improving operation fuel efficiency.

The air cooling type condenser 120 may be reduced in size by employing the water cooling type condenser 110. Cooling performance can be improved by increasing a passing air volume of the radiator 102 and simultaneously a temperature difference between external air and the liquid refrigerant can be increased, thereby being advantageous to form the sub cool of the refrigerant.

Further, the improvement of the cooling performance of the radiator 102 decreases the heat transfer amount of the cooling line 101, and water temperature of circulated coolant may be decreased, thus cooling the coolant without increasing a capacity of the radiator 102 and the cooling fan 104. Layout inside the narrow engine room is simplified, thus improving space availability, weight, and manufacturing cost.

Figure 2:
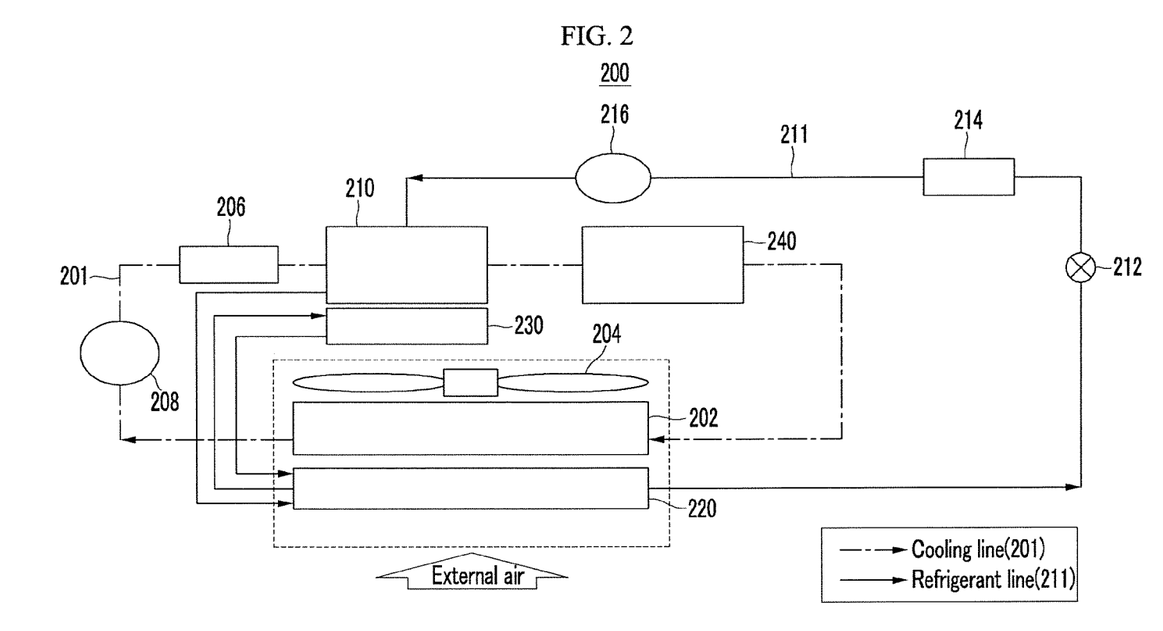
FIG. 2 is a block diagram of an air conditioner for a vehicle according to a second exemplary embodiment of the present disclosure.

FIG. 2 is a block diagram of an air conditioner for a vehicle according to a second exemplary embodiment of the present disclosure.

Referring to FIG. 2, an air conditioner 200 for a vehicle, which is applied to an environmentally-friendly vehicle such as a fuel cell vehicle, an electric vehicle, and the like, improves cooling performance by reducing condensation pressure and condensation performance of refrigerant by employing the water cooling type condenser using a coolant and the air cooling type condenser using external air together when a refrigerant is condensed.

The air conditioner 200 for the vehicle according to the second exemplary embodiment of the present disclosure includes a cooling means, a first condenser 210, and a second condenser 220.

The cooling means includes a radiator 202 disposed at front side of the vehicle, a cooling fan 204 for sending wind to the radiator 202, a reservoir tank 206 connected with the radiator 202 through a cooling line 201 through which a cooling fluid flows to store the cooling fluid, and a water pump 208 disposed on the cooling line 201 to circulate the cooling fluid.

Here, the cooling fan 204 is connected with a controller, which is not illustrated here, so that air volume may be adjusted according to a state of the vehicle. Temperature of the refrigerant or the cooling fluid and the cooling fluid may include a coolant.

The water cooling type condenser 210 is connected with the cooling line 201 between the radiator 202 and the reservoir tank 206 so that the cooling fluid flows in. A two-phase refrigerant in which a superheated steam refrigerant, and gas, liquid are mixed flows in a refrigerant line 211 through which the refrigerant flows from the compressor 216, so that the water cooling type condenser 210 first condenses the refrigerant through heat exchange between the coolant and the refrigerant.

The air conditioner means includes an expansion valve 212 for expanding the condensed refrigerant, an evaporator 214 for evaporating the expanded refrigerant through heat exchange between the expanded refrigerant and air, and a compressor 216 for compressing the refrigerant in an evaporated gas state, which are connected with each other through the refrigerant line 211.

The air conditioner means condenses the compressed refrigerant discharged from the compressor 216 by making the refrigerant sequentially pass through the water cooling type condenser 210 and the air cooling type condenser 220, which are connected with each other through the refrigerant line 211.

The air cooling type condenser 220 is connected with the water cooling type condenser 210 in series through the refrigerant line 211, so that the condensed liquid refrigerant flow in from the water cooling type condenser 210. The air cooling type condenser 220 is disposed at front side of the radiator 202 to condense the refrigerant through heat exchange with external air flowing in while driving and discharge the condensed refrigerant to a receiver drier 230.

The air cooling type condenser 220 receives only the liquid refrigerant from which the gas refrigerant is separated while passing through the receiver drier 230 and additionally condenses the received liquid refrigerant through heat exchange with external air to discharge the refrigerant to the expansion valve 212.

Here, the receiver drier 230, which separates a gas state refrigerant left in the condensed refrigerant, may be connected with the air cooling type condenser 220 through the refrigerant line 211, and may be separately provided. The receiver drier 230 separates a non-condensed gas refrigerant, which is included in the refrigerant condensed by the air cooling type condenser 220 and fails to be phase changed, from the liquid refrigerant and supplies the separated refrigerant to the air cooling type condenser 220 again.

A heating body 240 connected through the cooling line 201, into which the coolant passing through the water cooling type condenser 210 flows, may be disposed between the water cooling type condenser 210 and the radiator 202. The heating body 240 may include an electrical power component, a motor, or a stack applied to an environmentally-friendly vehicle, such as a fuel cell vehicle and an electric vehicle, and a water cooling type intercooler applied to an internal combustion engine vehicle.

That is, heat generated from the heating body 240 is cooled through heat exchange with the coolant which circulates in the cooling line 201 through an operation of the water pump 208 and discharged from the water cooling type condenser 210.

Accordingly, the coolant cools the heating body 240, flows into the radiator 202 again, and is cooled while circulating the cooling line 201 through the operation of the water pump 208 in a heated state. The coolant is stored in the reservoir tank 206 through the operation of the water pump 208 and flown into the water cooling type condenser 210 to be heat exchanged with the refrigerant, and the operation is repeated.

The air cooling type condenser 220 receives the first condensed two-phase refrigerant (a mixed refrigerant of a liquid and gas) through the water cooling type condenser 210, condenses the two-phase refrigerant through heat exchange with external air, and discharges the condensed refrigerant to the receiver drier 230.

The receiver drier 230 separates the non-condensed state gas refrigerant included in the flowing-in refrigerant from the liquid refrigerant, and makes only the liquid state refrigerant flow into the air cooling type condenser 220 through the refrigerant line 211 again. In this case, the receiver drier 230 may also filter foreign materials included in the refrigerant.

Then, the air cooling type condenser 220 condenses the liquid state refrigerant from which the gas state refrigerant failing to be phase changed is separated by the receiver drier 230 through heat exchange with external air again, thereby improving condensation efficiency of the refrigerant.

In the air conditioner 200, the water cooling type condenser 210 cools the refrigerant by using the coolant having a larger heat transfer coefficient than that of external air, thereby decreasing condensation pressure inside the water cooling type condenser 210.

Further, the air cooling type condenser 220 first condenses the refrigerant condensed while passing through the water cooling type condenser 210 through heat exchange with external air, makes the condensed refrigerant flow into the receiver drier 230, receives only the liquid state refrigerant, and cools the received liquid state refrigerant by using external air again in a state where the non-condensed gas refrigerant included in the liquid refrigerant is separated. A temperature difference between the external air and the refrigerant can be increased, thereby being advantageous to form sub cool and decreasing a heat transfer amount of the cooling line 201.

The air conditioner 200 for the vehicle employs the water cooling type condenser 210 and the air cooling type condenser 220 together to complement the drawbacks according to each type by efficiently using the condensation pressure decrease, which is the advantage of the water cooling type, and forming of the sub cool, which is the advantage of the air cooling type, thereby improving general cooling performance of the air conditioner 200.

The condensers 210 and 220 condensing the refrigerant are formed in the water cooling type and the air cooling type, respectively, to be applied together. The water cooling type condenser 210 condenses the superheated steam refrigerant and the two-phase area refrigerant (the mixed refrigerant of gas and liquid). The air cooling type condenser 220 secondarily condenses the liquid refrigerant passing through the receiver drier 230 in a state where the two-phase area refrigerant is additionally condensed again, thereby increasing condensation performance of the refrigerant and improving general cooling performance.

The work load of the compressor is decreased by decreasing the condensation pressure of the refrigerant, thereby improving operation fuel efficiency.

The air cooling type condenser 220 may be reduced in size by employing the water cooling type condenser 210, so that cooling performance is improved by increasing air volume of the radiator 202. The temperature difference between external air and the liquid refrigerant can be increased simultaneously, thereby being advantageous to form the sub cool of the refrigerant.

The improvement of the cooling performance of the radiator 202 decreases the heat transfer amount of the cooling line 201. Water temperature of the circulated coolant may be decreased to efficiently cool the coolant without increasing a capacity of the radiator 202 and the cooling fan 204, simplify layout inside the narrow engine room so that space availability is improved, and decrease weight and manufacturing cost.

Further, when the present disclosure is applied to an environmentally-friendly vehicle, such as a fuel cell vehicle and an electric car, the heating body 240, such as the electrical power component, the motor, and the stack or the intercooler of the internal combustion engine vehicle, and the air conditioner refrigerant may be cooled by using the one integrated radiator 202, thereby improving cooling performance and simplifying the configuration.

Figure 3:
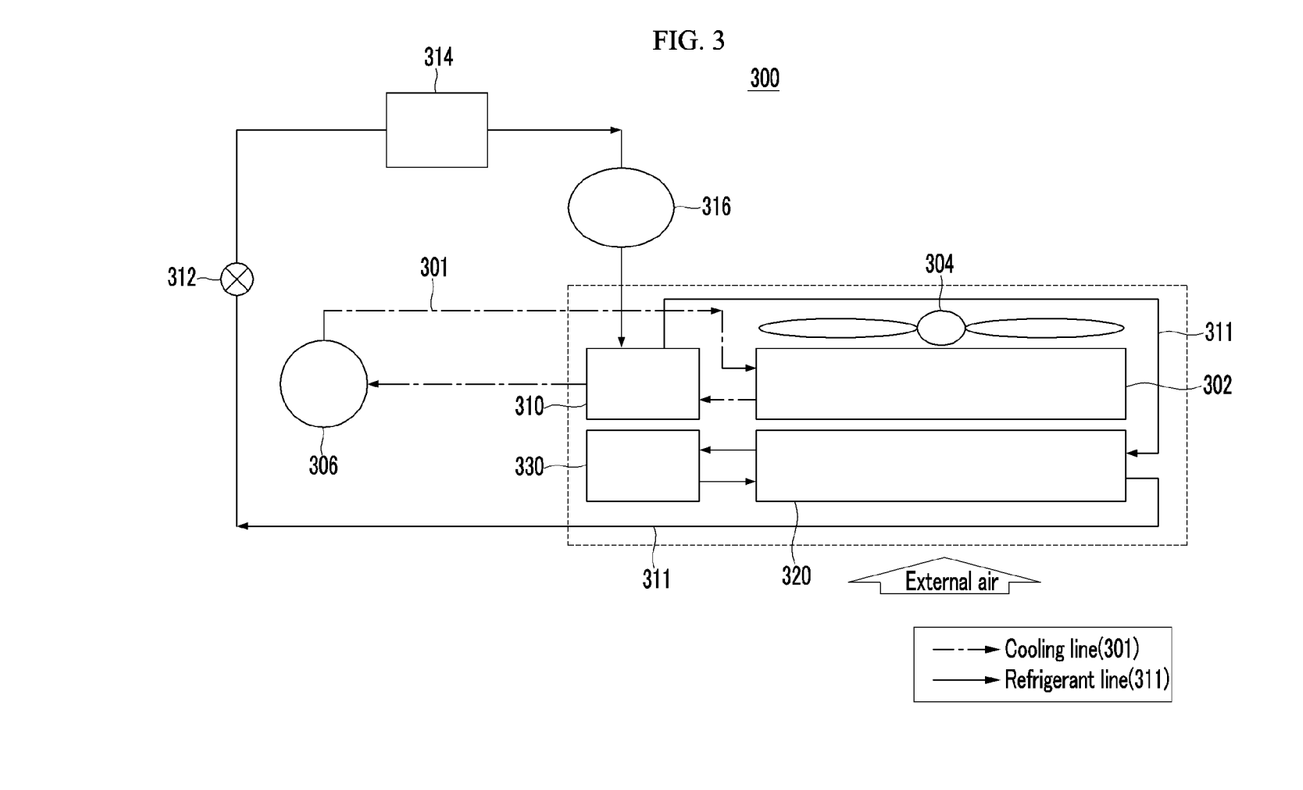
FIG. 3 is a block diagram of an air conditioner for a vehicle according to a third exemplary embodiment of the present disclosure.

FIG. 3 is a block diagram of an air conditioner system for a vehicle according to a third exemplary embodiment of the present disclosure.

Referring to FIG. 3, an air conditioner 300 for a vehicle according to the third exemplary embodiment of the present disclosure improves cooling performance by reducing condensation pressure and increases condensation performance of a refrigerant by applying a water cooling type condenser using a coolant and an air cooling type condenser using external air together when the refrigerant is condensed.

The air conditioner 300 for the vehicle includes an expansion valve 312 for expanding a liquid refrigerant, an evaporator 314 for evaporating the refrigerant expanded through the expansion valve 312 through heat exchange between the expanded refrigerant and air, and a compressor 316 for receiving the refrigerant in a gas state from the evaporator 312 and compressing the received refrigerant, which are connected with each other through a refrigerant line 311.

The air conditioner 300 for the vehicle further includes a cooling means, a water cooling type condenser 310, and an air cooling type condenser 320, and each constituent element will be described in more detail below.

The cooling means includes a radiator 302 provided at front side of the vehicle, a cooling fan 304 for sending wind to the radiator 302, and a water pump 306 connected with the radiator 302 through the cooling line 301 to circulate the cooling fluid.

Here, the cooling fan 304 is connected with a controller, which is not illustrated here, so that air volume may be adjusted according to a state of the vehicle and the temperature of the refrigerant or the cooling fluid The cooling fluid may include a coolant.

The water cooling type condenser 310 is connected with the cooling line 301 between the radiator 302 and the water pump 306 so that the cooling fluid inflows. A two-phase refrigerant in which a superheated steam refrigerant, gas, and, liquid are mixed inflows through a refrigerant line 311 through which the refrigerant flow from the condenser 316, so that the water cooling type condenser 310 condenses the refrigerant through heat exchange between the coolant and the refrigerant.

The water cooling type condenser 310 is disposed at one side of the radiator 302 in a width direction of the vehicle.

The air cooling type condenser 320 is connected with the water cooling type condenser 310 in series through the refrigerant line 311, so that the condensed liquid refrigerant inflows from the water cooling type condenser 310.

The air cooling type condenser 320 is disposed at front side of the radiator 302 to condense the refrigerant through heat exchange with external air flowing in while driving and discharge the condensed refrigerant to a receiver drier 330.

The air cooling type condenser 320 receives only the liquid refrigerant from which the gas refrigerant is separated while passing through the receiver drier 330 and additionally condenses the received liquid refrigerant through heat exchange with external air to discharge the refrigerant to the expansion valve 312.

The receiver drier 330, which separates a gas state refrigerant left in the condensed refrigerant, may be connected with the air cooling type condenser 320 through the refrigerant line 311, and may be separately provided. The receiver drier 330 separates a non-condensed gas refrigerant, which is included in the refrigerant condensed by the air cooling type condenser 320 and fails to be phase changed, from the liquid refrigerant and supplies the separated refrigerant to the air cooling type condenser 320 again.

That is, the receiver drier 330 separates a non-condensed gas refrigerant, which is included in the refrigerant condensed by the air cooling type condenser 320 and fails to be phase changed, from the liquid refrigerant and supplies the separated refrigerant to the air cooling type condenser 320 again.

Further, the air cooling type condenser 320 receives a two-phase refrigerant (a mixed refrigerant of a liquid and gas) first condensed through the water cooling type condenser 310, condenses the received two-phase refrigerant through heat exchange with external air, and discharges the condensed refrigerant to the receiver drier 330.

The receiver drier 330 separates the non-condensed state gas refrigerant included in the introduced refrigerant from the liquid refrigerant, and makes only the liquid state refrigerant flow into the air cooling type condenser 320 through the refrigerant line 311 again.

In this case, the receiver drier 330 may also filter foreign materials included in the refrigerant.

Then, the air cooling type condenser 320 condenses the liquid state refrigerant from which the gas state refrigerant failing to be phase changed is separated by the receiver drier 330 through heat exchange with external air again, thereby improving condensation efficiency of the refrigerant.

The water cooling type condenser 310 cools the refrigerant by using a coolant having a larger heat transfer coefficient than that of external air, thereby decreasing condensation pressure inside the water cooling type condenser 310.

Further, the air cooling type condenser 320 first condenses the refrigerant condensed while passing through the water cooling type condenser 310 through heat exchange with external air, makes the condensed refrigerant flow into the receiver drier 330, and receives only the liquid state refrigerant again and cools the received liquid state refrigerant by using external air again in a state where the non-condensed gas refrigerant included in the liquid refrigerant is separated. A temperature difference between the external air and the refrigerant can be increased, thereby being advantageous to form sub cool and decreasing a heat transfer amount of the cooling line 301.

The air conditioner 300 employs the water cooling type condenser 310 and the air cooling type condenser 320 together to complement the drawbacks according to each type by efficiently using the condensation pressure decrease, which is the advantage of the water cooling type, and the advantageous forming of the sub cool, which is the advantage of the air cooling type, thereby improving general cooling performance of the air conditioner 300.

The condensers 310 and 320 condensing the refrigerant are formed in the water cooling type and the air cooling type, respectively, to be applied together. The water cooling type condenser 310 condenses the superheated steam refrigerant and the two-phase area refrigerant (the mixed refrigerant of gas and liquid), and the air cooling type condenser 320 secondarily condenses the liquid refrigerant passing through the receiver drier 330 in a state where the two-phase area refrigerant is additionally condensed again, thereby increasing condensation performance of the refrigerant and improving general cooling performance.

The work load of the compressor can be decreased by decreasing the condensation pressure of the refrigerant, thereby improving operation fuel efficiency.

The air cooling type condenser 320 may be reduced in size by employing the water cooling type condenser 310, so that cooling performance can be improved by increasing a passing air volume of the radiator 302, and simultaneously a temperature difference between external air and the liquid refrigerant can be increased, thereby being advantageous to form the sub cool of the refrigerant.

The improvement of the cooling performance of the radiator 302 decreases the heat transfer amount of the cooling line 301. Water temperature of a circulated coolant may be decreased to efficiently cool the coolant can be efficiently cooled without increasing a capacity of the radiator 302 and the cooling fan 304, simplify layout inside the narrow engine room so that space availability is improved, and decrease weight and manufacturing cost.

Figure 4:
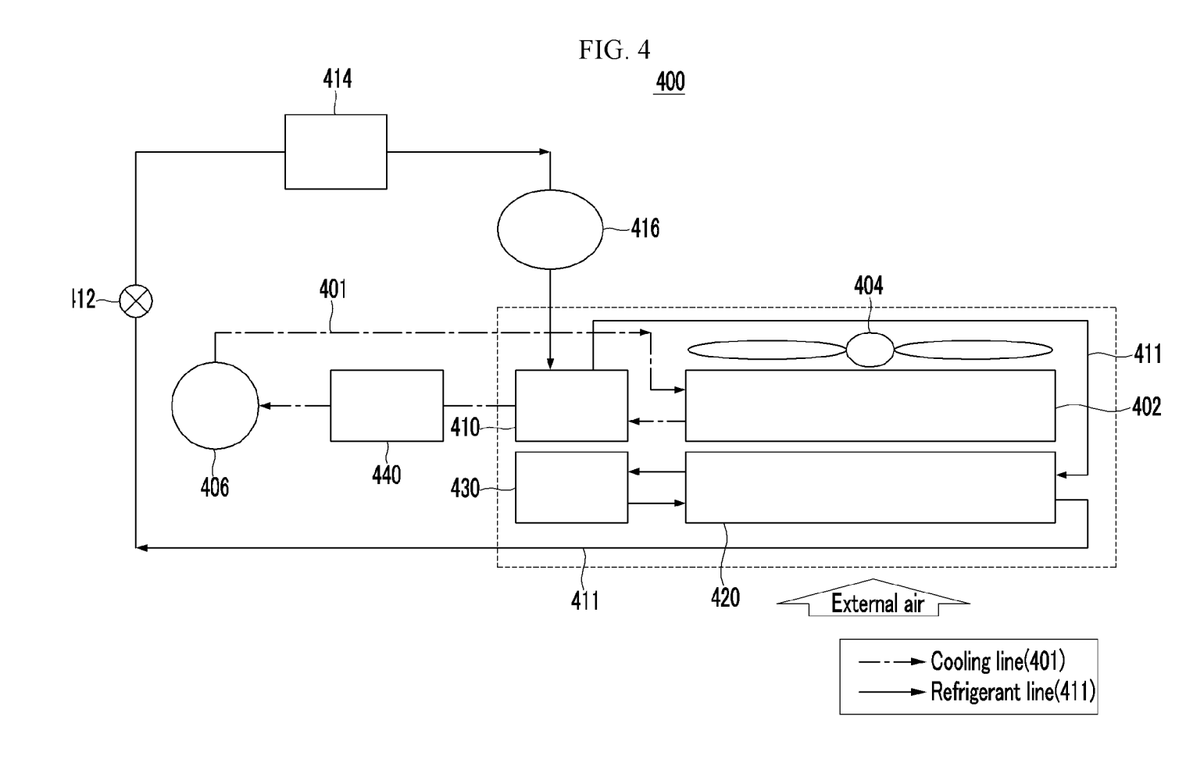
FIG. 4 is a block diagram of an air conditioner for a vehicle according to a fourth exemplary embodiment of the present disclosure.

FIG. 4 is a block diagram of an air conditioner for a vehicle according to a fourth exemplary embodiment of the present disclosure.

Referring to FIG. 4, an air conditioner system 400 for a vehicle, which is applied to a fuel cell vehicle, an electric vehicle, and the like, which are an environmentally-friendly vehicles, improves cooling performance by reducing condensation pressure and condensation performance of refrigerant by employing the water cooling type condenser using a coolant and the air cooling type condenser using external air together when a refrigerant is condensed.

The air conditioner 400 for the vehicle includes an expansion valve 412 for expanding a liquid refrigerant, an evaporator 414 for evaporating the refrigerant expanded through the expansion valve 412 through heat exchange between the expanded refrigerant and air, and a compressor 416 for receiving the refrigerant in a gas state from the evaporator 412 and compressing the received refrigerant, which are connected with each other through a refrigerant line 411.

Here, the air conditioner 400 for the vehicle further includes a cooling means, a water cooling type condenser 410, and an air cooling type condenser 420, and each constituent element will be described in more detail below.

The cooling means includes a radiator 402 provided at a front side of the vehicle, a cooling fan 404 for sending wind to the radiator 402, and a water pump 406 connected with the radiator 402 through the cooling line 401 to circulate the cooling fluid.

Here, the cooling fan 404 is connected with a controller, which is not illustrated here, so that an air volume may be adjusted according to a state of the vehicle, and a temperature of the refrigerant or the cooling fluid. The cooling fluid may include a coolant.

The water cooling type condenser 410 is connected with the cooling line 401 between the radiator 402 and the water pump 406 so that the cooling fluid inflows. A two-phase refrigerant in which a superheated steam refrigerant, gas, and liquid are mixed inflows through a refrigerant line 411 through which the refrigerant flow from the compressor 416 of an air conditioner means, so that the water cooling type condenser 410 first condenses the refrigerant through heat exchange between the coolant and the refrigerant.

The water cooling type condenser 410 is positioned at one side of the radiator 402 in a width direction of the vehicle.

The air cooling type condenser 420 is connected with the water cooling type condenser 410 in series through the refrigerant line 411, so that the condensed liquid refrigerant inflows from the water cooling type condenser 410.

The air cooling type condenser 420 is disposed at a front side of the radiator 402 to condense the refrigerant through heat exchange with external air flowing in while driving and discharge the condensed refrigerant to a receiver drier 430.

Further, the air cooling type condenser 420 receives only the liquid refrigerant from which the gas refrigerant is separated while passing through the receiver drier 430 and additionally condenses the received liquid refrigerant through heat exchange with external air to discharge the refrigerant to the expansion valve 412.

Here, the receiver drier 430, which separates a gas state refrigerant left in the condensed refrigerant, may be connected with the air cooling type condenser 420 through the refrigerant line 411, and may be separately provided.

The receiver drier 430 separates a non-condensed gas refrigerant, which is included in the refrigerant condensed by the air cooling type condenser 420 and fails to be phase changed, from the liquid refrigerant and supplies the separated refrigerant to the air cooling type condenser 420.

A heating body 440 connected through the cooling line 401, into which the coolant passing through the water cooling type condenser 410 flows, may be disposed between the water cooling type condenser 410 and the radiator 402.

The heating body 440 may include an electrical power component, a motor, or a stack applied to an environmentally-friendly vehicle, such as a fuel cell vehicle and an electric vehicle, and a water cooling type intercooler applied to an internal combustion engine vehicle.

Heat generated from the heating body 440 is cooled through heat exchange with the coolant which circulates the cooling line 401 through an operation of the water pump 406 and is discharged from the water cooling type condenser 410.

Accordingly, a coolant cools the heating body 440, flows into the radiator 402 again while circulating the cooling line 401 through the operation of the water pump 406 in a heated state, flows into the water cooling type condenser 410 through the operation of the water pump 406 to be heat exchanged with the refrigerant, and the operation is repeatedly performed.

The air cooling type condenser 420 receives the first condensed two-phase refrigerant (a mixed refrigerant of a liquid and gas) through the water cooling type condenser 410, condenses the two-phase refrigerant through heat exchange with external air, and discharges the condensed refrigerant to the receiver drier 430.

The receiver drier 430 separates the non-condensed state gas refrigerant included in the flowing-in refrigerant from the liquid refrigerant and makes only the liquid state refrigerant flow into the air cooling type condenser 420 through the refrigerant line 411 again.

In this case, the receiver drier 430 may also filter foreign materials included in the refrigerant.

Then, the air cooling type condenser 420 condenses the liquid state refrigerant from which the gas state refrigerant failing to be phase changed is separated by the receiver drier 430 through heat exchange with external air again, thereby improving condensation efficiency of the refrigerant.

The water cooling type condenser 410 cools the refrigerant by using the coolant having a larger heat transfer coefficient than that of external air, thereby decreasing condensation pressure inside the water cooling type condenser 410.

Further, the air cooling type condenser 420 first condenses the refrigerant condensed while passing through the water cooling type condenser 410 through heat exchange with external air, makes the condensed refrigerant flow into the receiver drier 430, receives only the liquid state refrigerant again, and cools the received liquid state refrigerant by using external air in a state where the non-condensed gas refrigerant included in the liquid refrigerant is separated. The temperature difference between the external air and the refrigerant can be increased, thereby being advantageous to form sub cool and decreasing a heat transfer amount of the cooling line 401.

That is, the air conditioner 400 employs the water cooling type condenser 410 and the air cooling type condenser 420 together to complement the drawbacks according to each type by efficiently using the condensation pressure decrease, which is the advantage of the water cooling type, and the advantageous forming of the sub cool, which is the advantage of the air cooling type, thereby improving general cooling performance of the air conditioner 400.

The condensers 410 and 420 condensing the refrigerant are formed in the water cooling type and the air cooling type, respectively, to be applied together. The water cooling type condenser 410 condenses the superheated steam refrigerant and the two-phase area refrigerant (the mixed refrigerant of gas and the liquid), and the air cooling type condenser 420 secondarily condenses the liquid refrigerant passing through the receiver drier 430 in a state where the two-phase area refrigerant is additionally condensed again, thereby increasing condensation performance of the refrigerant and improving general cooling performance.

The work load of the compressor can be decreased by decreasing the condensation pressure of the refrigerant, thereby improving operation fuel efficiency.

The air cooling type condenser 420 may be reduced in size by employing the water cooling type condenser 410 to improve cooling performance by increasing a passing air volume of the radiator 402 and simultaneously increase a temperature difference between external air and the liquid refrigerant, thereby being advantageous to form the sub cool of the refrigerant.

The improvement of the cooling performance of the radiator 402 decreases the heat transfer amount of the cooling line 401. Water temperature of a circulated coolant may be decreased to efficiently cool the coolant without increasing a capacity of the radiator 402 and the cooling fan 404, simplify layout inside the narrow engine room so that space availability is improved, and decrease weight and manufacturing cost.

Further, when the present disclosure is applied to an environmentally-friendly vehicle, such as a fuel cell vehicle and an electric car, the heating body 440, such as the electrical power component, the motor, and the stack or the intercooler of the internal combustion engine vehicle, and the air conditioner refrigerant may be cooled by using the one integrated radiator 402, thereby improving cooling performance and simplifying the configuration.

While the present disclosure has been described in connection with what is presently considered to be practical exemplary embodiments, the inventive concept is not limited to the disclosed embodiments, but, on the contrary, is intended to cover various modifications and equivalent arrangements included within the spirit and scope of the appended claims.

What is claimed is:

1. An air conditioning system for a vehicle, comprising:
a cooler including: a first radiator; a cooling fan configured to send air flow to the first radiator; a reservoir tank communicating with the first radiator via a cooling line and storing a cooling fluid; and a water pump disposed on the cooling line between the reservoir tank and the first radiator to circulate the cooling fluid;
a water-cooled condenser connected to the cooling line between the first radiator and the reservoir tank so that the cooling fluid flows into the first radiator, the water cooling condenser condensing superheated steam and a two-phase refrigerant, which includes gas and liquid via heat exchange with the cooling fluid; and
an air-cooled condenser communicating with the water-cooled condenser via a refrigerant line in series, so that the condensed refrigerant flows from the water-cooled condenser into the air-cooled condenser through the refrigerant line,
wherein the air-cooled condenser is disposed at one side of the first radiator to condense the refrigerant via heat exchange with external air as the vehicle travels and discharge the condensed refrigerant to a receiver drier,
wherein the air-cooled condenser receives only a liquid refrigerant as the liquid refrigerant passes through the receiver drier to additionally condense the received liquid refrigerant by heat exchange with external air and to discharge the condensed refrigerant,
wherein the receiver drier communicates with the air-cooled condenser via the refrigerant line, and
wherein the refrigerant flows sequentially from the water-cooled condenser directly to the air-cooled condenser, from the air-cooled condenser directly to the receiver drier, and then from the receiver drier directly to the air-cooled condenser.

2. The air conditioning system of claim 1, further comprising:

an air conditioner including: an expansion valve for expanding the condensed refrigerant; an evaporator for evaporating the expanded refrigerant by heat exchange with external air; and a compressor for compressing the evaporated gas state refrigerant, wherein the expansion valve and the evaporator communicate with each other via the refrigerant line, and wherein the air conditioner condenses the compressed refrigerant that is discharged from the compressor by allowing the discharged refrigerant to pass sequentially through the water-cooled condenser and the air-cooled condenser.

3. The air conditioning system of claim 1, wherein:

a heating body connected through the cooling line, into which the cooling fluid passing through the water cooled condenser flows, is disposed between the water cooled condenser and the first radiator.

4. The air conditioning system of claim 3, wherein:

the heating body includes an electrical power component, a motor, or a stack of an environmentally-friendly vehicle, and a water-cooled intercooler of an internal combustion engine vehicle.

5. The air conditioning system of claim 1, further comprising:

a second radiator disposed between the first radiator and the cooling fan and configured to cool an internal combustion engine.

\* \* \* \* \*